March 29, 1966 A. J. STEER 3,243,712

CONVERTER CIRCUITS FOR COUNTERS

Filed Aug. 6, 1963

INVENTOR.

ANTONIUS J. STEER

BY

Frank R. Trifari

AGENT 3,243,712

CONVERTER CIRCUITS FOR COUNTERS

Antonius Joannes Steer, Emmasingel, Eindhoven, Netherlands, assignor to North American Philips Company, Inc., New York, N.Y., a corporation of Delaware Filed Aug. 6, 1963, Ser. No. 300,311
Claims priority, application Netherlands, Aug. 24, 1962, 282,501
16 Claims. (Cl. 328—154)

This invention relates to a converter circuit for a counter intended to convert the positive or negative pulses to be counted positively or negatively into positive or negative counting pulses to be fed to the counter in such a manner that the counter presents the result of the counting, whether positive or negative, in uncomplemented form. Many counters, either mechanical, electromechanical or electronic, indicate negative numbers in complemented form, that is to say the negative figures —1, —2, —3 . . . are represented by . . . 999, . . . 998, . . . 997, . . . This is a drawback in those applications in which the counter must frequently indicate negative numbers because the risk of mistakes is thus increased. A known method of avoiding this drawback consists in that the number indicated by the counter is changed so that both positive and negative numbers are invariably represented in uncomplemented form. This may be effected, for example, if the counter indicates a negative number, by replacing each figure indicated by the counter by its 9-complement and adding 1 to the resulting number. However, this solution may involve great difficulties because it necessitates modification of an existing construction, which is in certain cases undesirable or impermissible. An object of the invention is to provide a solution of the problem presented which necessitates no modification, or only an extremely small modification, of an existing construction. According to the invention, this object is attained by adding to the counter an auxiliary circuit which converts the incoming positive counting pulses into negative counting pulses and conversely if the counter indicates a negative result. According to the invention, this is achieved by providing an auxiliary circuit having an input terminal for the reception of positive counting pulses, an input terminal for the reception of negative counting pulses, and an additional input terminal which is intended to receive a bivalued signal from the counter to indicate whether the counter is in the position . . . 000 or not. The auxiliary circuit also includes a flip-flop having its 0-input connected to the output of an and-gate. One input of the and-gate is connected to the additional input terminal of the auxiliary circuit and the other input is connected to the input terminal for the positive counting pulses. The 1-input of the flip-flop is connected to the output of another and-gate. One input of the other and-gate is connected to the additional input terminal of the auxiliary circuit and the other input is connected to the input terminal for the negative counting pulses. The outputs of the flip-flop are connected to switching means so that a counting pulse applied to one of the input terminals is supplied to one or the other of two output terminals, dependent upon the position of the flip-flop. It is to be noted that the term "positive counting pulses" is to be understood herein to mean those pulses which have to increase by 1 the result indicated by the counter and that the term "negative counting pulses" is to be understood to mean those pulses which have to reduce by 1 the result indicated by the counter. So the words "positive" and "negative" refer only to the counting process and do not refer to the polarity of the counting pulses.

In order that the invention may be readily carried into effect, two embodiments thereof will now be described in detail, by way of example, with reference to the accompanying diagrammatic drawing in which.

Figure 1:
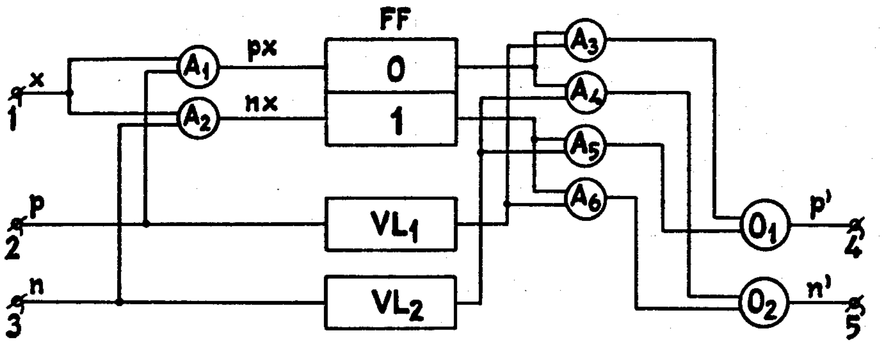
FIG. 1 illustrates a first embodiment of the invention.

FIGURE 1 shows a first example of the invention. The circuit shown has three input terminals 1, 2 and 3 and two output terminals 4 and 5. The input terminal 1 is connected to the counter and receives a bivalued signay $x$ which indicates whether the counter is in the position . . . 000 or not. In the first case, the signal $x$ has the value 1 and in the second case the value 0. The counter must therefore be constructed so that it can deliver this signal $x$. In the case frequently occurring that the counter is constructed so that, instead of the signal $x$, it can deliver signals $x_0, x_1, x_2 \ldots x_{s-1}$ ($s$ being the number or digit positions of the counter) which indicate whether the counter at the digit positions 0, 1, 2 . . . $s$—1 indicates the digit 0 or not, there is written in Boolean algebraic form $x=x_0, x_1, x_2, \ldots x_{s-1}$, so that the signal $x$ can in that case be deduced from the signal$x_{10}$, $x_1, x_2 \ldots x_{s-1}$ by means of a multiple input and-gate.

The pulses to be counted are supplied to the input terminals 2 and 3, that is to say the pulses $p$ to be counted positively to the input terminal 2 and the pulses $n$ to be counted negatively to the input terminal 3. It is possible that the pulses to be counted positively or negatively are received in the first instance through a single wire, but that the pulses to be counted positively are distinguished from the pulses to be counted negatively by some feature or other, for example, by means of their polarity. Such pulses which are distinguished from one another by some feature or other can, however, be converted in known manner and by known means into pulses in either the one or the other of two wires. It is even possible that the pulses to be counted are in the first instance not of electrical nature but consist of, for example, rotational movements of a small mounting wheel in either one or the other of two senses or rotation. Such rotational movements in the one or the other sense of rotation can also be converted in known manner and by known means into pulses in either one or the other of two wires.

The output terminals 4 and 5 deliver the counting pulses to be supplied to the counter. The pulses $p'$ to be counted positively are delivered by the output terminal 4 and the pulses $n'$ to be counted negatively are delivered by the output terminal 5. If necessary, said pulses may again be converted in known manner and by known means into pulses having one of two different features in a single wire, or into rotational movements of a counting wheel in the one or the other sense of rotation.

The auxiliary circuit has to be arranged so that it passes the pulses $p$ from the input terminal 2 to the output terminal 4 if the counter indicates a positive number (or is on positive), but from the input terminal 2 to the output terminal 5 if the counter indicates a negative number (or is on negative). In contrast, the pulses $n$ have to be passed from the input terminal 3 to the output terminal 5 if the counter is on positive, but to the output terminal 4 if the counter is on negative. Whether the one or the other takes place depends upon the position of the flip-flop FF. The 0-position of this flip-flop corresponds to the counter being on positive and the 1-position of the flip-flop corresponds to the counter being on negative. The input terminals 2 and 3 are connected to the output terminals 4 and 5 in the manner shown through delay lines $VL_1$ and $VL_2$, four and-gates $A_3$, $A_4$, $A_5$ and $A_6$, which are also connected to outputs of the flip-flop FF, and two or-gates $O_1$ and $O_2$. If the flip-flop is in the 0-position (counter is on positive) the pulses $p$ follow the path 2–$VL_1$–$A_3$–$O_1$–4 and the pulses *n* follow the path 3–$VL_2$–$A_4$–$O_2$–5. The path from the input terminal 2 to the output terminal 5, which leads through the and-gate $A_6$, is now closed, i.e. the path is broken to prevent the passage of pulses therethrough, as is the path from the input terminal 3 to the output terminal 4, which leads through the and-gate $A_5$. If the flip-flop FF is in the 1 position (counter is on negative) the pulses *p* follow the path 2–$VL_1$–$A_6$–$O_2$–5 and the pulses *n* follow the path 3–$VL_2$–$A_5$–$O_1$–4. The path from the input terminal 2 to the output terminal 4 (through the and-gate $A_3$) and the path from the input terminal 3 to the output terminal 5 (through the and-gate $A_4$) are now closed or broken to prevent the passage of pulses therethrough.

The flip-flop FF is set to the correct position under control of the signal *x*. It will be evident that the position of the flip-flop must change only if the counter is in the position . . . 000 and thereafter a positive or a negative counting pulse is received. However, this counting pulse itself must always be passed on to the output terminal 4, irrespective of whether it is positive or negative. To this end, the 0-input of the flip-flop FF is connected through an and-gate $A_1$ to the input terminals 1 and 2 and the 1-input is connected through and and-gate $A_2$ to the input terminals 1 and 3. Said and-gates thus deliver the signals *px* and *nx*. If the counter is in the position . . . 000 and the signal *x* thus has the value 1, the flip-flop is set to the 0-position by a positive counting pulse *p*, unless it was already in this position, in which event it remains in the 0-position. If the counter is in the position . . . 000, the flip-flop FF is set to the 1-position by a negative counting pulse, unless it was already in this position, in which event it remains in this position. The delay lines $VL_1$ and $VL_2$ provide a transmission delay so that a counting pulse received at either of the input terminals 2 and 3 is passed on to the and-gates $A_3$, $A_6$ or $A_4$, $A_5$ only if the flip-flop FF, in the event it has to change-over, has reached its new position. Of the counter is not in the position . . . 000, the signal *x* has the value 0 so that no pulses are fed to the input terminals of the flip-flop FF. So in this case the flip-flop will never change its position.

Figure 2:
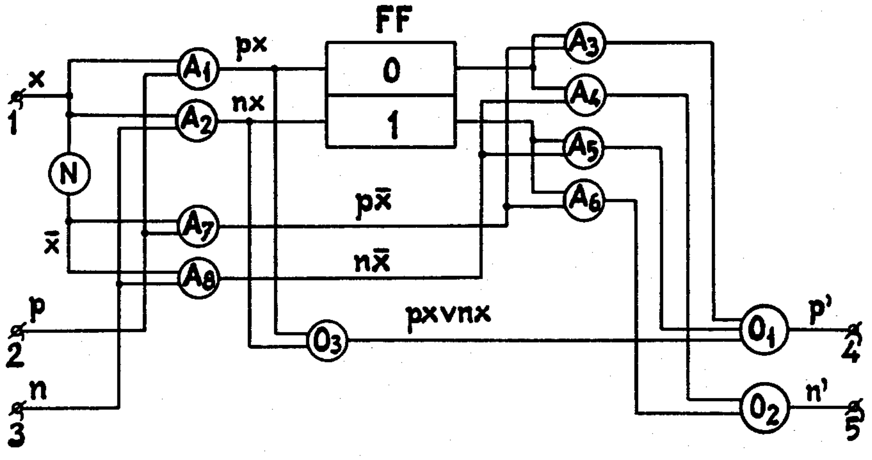
FIG. 2 illustrates a second embodiment of the invention.

FIGURE 2 shows an embodiment in which the delay lines $VL_1$ and $VL_2$ are replaced by and-gates $A_7$ and $A_8$ and a not-gate N which can be realized in a simple manner. Gate N may comprise a simple inverting amplifier. If the counter is not in the position . . . 000, the signal *x* has the value 0 and hence the signal $\overline{x}$ has the value 1. If the flip-flop FF is in the 0-position, the paths

2–$A_7$–$A_3$–$O_1$–4 and

3–$A_8$–$A_4$–$O_2$–5 are open and if the flip-flop FF is in the 1-position, the paths

2–$A_7$–$A_6$–$O_2$–5 and

3–$A_8$–$A_5$–$O_1$–4 are open. However, if the counter is in the position . . . 000, the signal *x* has the value 1 and hence $\overline{x}=0$. The above-mentioned paths from the input terminals 2 and 3 to the output terminals 4 and 5, which extend through the and-gates $A_7$ or $A_8$, are thus all of them closed or broken. However, a counting pulse received at the input terminal 2 or 3 now invariably passes through $A_1$ or $A_2$ and the or-gates $O_3$ and $O_1$ in series to the output terminal 4. The flip-flop FF is set to the desired position in the manner above described. However, the counting pulses must in this case be shorter than the counting delay of the counter since otherwise it would count a "1" too much or too little. Let it be assumed, for example, that the counter indicates . . . 000 and a positive counting pulse *p* is received. The signal *x* now has the value 1 and the signal $\overline{x}$ has the value 0. The counting pulse *p* now follows the path 2–$A_1$–$O_3$–$O_1$–4 to the counter which thus makes a positive step and jumps into the position 001. Consequently, the signal *x* assumes the value 0 and the signal $\overline{x}$ the value 1. The path 2–$A_1$–$O_3$–$O_1$–4 is thus closed or broken. But if the counting pulse *p* had not yet terminated, the remainder of this pulse would follow the path 2–$A_7$–$A_3$–$O_1$–4 or

2–$A_7$–$A_6$–$O_2$–5 to the counter which would thus again make a positive or a negative step and jump into the position . . . 002 or . . . 000. Whether the one or the other takes place depends upon the instantaneous position of the flip-flop FF and this may be dependent inter alia upon the change-over delay of the flip-flop.

What is claimed is:

1. Apparatus for use with a bidirectional counter having a reference condition and first and second count conditions, said counter including input means for receiving positive and negative count pulses and output means for supplying a bivalued control signal determined by the condition of said counter ,said signal having a first value in the reference condition of said counter and a second value when said counter is in either of said first and second count conditions, said apparatus comprising first and second input terminals for receiving positive and negative count pulses, respectively, a third input terminal for connection to said counter output means for receiving said bivalued control signal, first and second output terminals for supplying positive and negative count pulses, respectively, to said counter input means, switching means for selectively interconnecting said first and second input terminals with said first and second output terminals, and control means coupled to said third input terminal and responsive to the control signal thereat for selectively actuating said switching means so that a count pulse received at either of said first and second input terminals is directed to one or the other of said first and second output terminals in accordance with the condition of said counter.

2. Apparatus as described in claim 1 wherein said control means comprises, a flip-flop having first and second input and output means, first and second gating means each of which comprises two inputs and an output, means connecting the outputs of said first and second gating means to said flip-flop first and second inputs, respectively, means connecting the first and second inputs of said first gating means to said first and third input terminals, respectively, means connecting the first and second inputs of said second gating means to said second and third input terminals, respectively, and means coupling said flip-flop output means to said switching means thereby to selectively actuate said switching means in accordance with the condition of said flip-flop.

3. Apparatus as described in claim 2 wherein said flip-flop output means comprises first and second output terminals and said switching means comprises first, second, third and fourth gating devices each of which comprises first and second inputs and an output, means connecting said first input of said first and second gating devices to said flip-flop first output terminal and said first input of said third and fourth gating devices to said flip-flop second output terminal, means connecting said second input of said first and fourth gating devices to said first input terminal and said second input of said second and third gating devices to said second input terminal, and means connecting the output of said first and third gating devices to said first output terminal and the output of said second and fourth gating devices to said second output terminal.

4. Apparatus as described in claim 2 further comprising third and fourth gating means serially connected between said first and second input terminals and said switching means, respectively, to control the passage of said count pulses from said input terminals to said switching means, means responsive to said counter control signal for selectively actuating said third and fourth gating means to pass said count pulses in the first or second condition of said counter and to block the passage of said count pulses in the reference condition of said counter, means providing an alternate path between said first and second input terminals and said first output terminal for said count pulses, said alternate path comprising gating means responsive to said counter control signal for controlling the passage of said count pulses, said control signal being operable to open said latter gating means only in the reference condition of said counter.

5. Apparatus as described in claim 4 wherein said latter gating means of said alternate path comprises said first and second gating means and means for connecting the output of each of said first and second gating means to said first output terminal.

6. Apparatusfor use with a bidirectional counter having a zero condition and positive and negative count conditions, said counter including input means for receiving positive and negative count pulses and output means for supplying a control signal having first and second values determined by the condition of said counter, said apparatus comprising first and second input terminals for receiving positive and negative count pulses, respectively, a third input terminal for connection to said counter output means for receiving said control signal, first and second output terminals for supplying positive and negative count pulses, respectively, to said counter input means, and means coupled to said third input terminal and responsive to the control signal thereat for selectively interconnecting said first and second input terminals with said first and second output terminals, respectively, in the positive count condition of said counter and interconnecting said first and second input terminals with said second and first output termials, respectively, in the negative count condition of said counter.

7. Apparatus as described in claim 6 wherein said means for selectively interconnecting said first and second input and output terminals comprises switching means, first and second electrical transmission paths coupling said first and second input terminals, respectively, to said switching means, third and fourth electrical transmission paths coupling said first and second output terminals, respectively, to said switching means, a flip-flop having first and second inputs and output means coupled to said switching means, and control means connected between said third input terminal and said first and second flip-flop inputs for controlling the state of said flip-flop in accordance with the condition of said counter whereby said switching means is actuated to selectively interconnect said first and second transmission paths with said third and fourth transmission paths.

8. Apparatus as described in claim 7 wherein said first value of said control signal corresponds to the zero condition of said counter and the second value thereof corresponds to the positive and negative conditions of said counter, said control means comprising a logic circuit coupled between said first, second and third input terminals and said first and second flip-flop inputs and arranged to switch the state of said flip-flop only at the first value of the control signal appearing at said third input terminal.

9. Apparatus as described in claim 8 wherein said logic circuit comprises first and second AND gates each of which comprises first and second inputs and an output, means individually connecting the outputs of said first and second AND gates to said flip-flop first and second inputs, respectively, means connecting the first and second inputs of said first AND gate to said first and third input terminals, respectively, and means connecting the first and second inputs of said second AND gate to said second and third input terminals, respectively.

10. Apparatus as described in claim 7 further comprising first and second pulse delay means serially connected in said first and second transmission paths, respectively.

11. Apparatus for use with a bidirectional counter having a zero condition and positive and negative count conditions, said counter including input means for receiving positive and negative count pulses and output means for supplying a control signal having a first value corresponding to the zero condition of the counter and a second value corresponding to the positive and negative count conditions of the counter, said apparatus comprising first and second input terminals for receiving positive and negative count pulses, respectively, first and second output terminals for supplying positive and negative count pulses, respectively, to said counter input means, switching means, electrical transmission path means comprising said switching means for selectively interconnecting said input and output terminals, a third input terminal for connection to said counter output means for receiving said control signal, first gating means controlled from said third input terminal and serially connected in said transmission path means to control the passage of said positive and negative count pulses in accordance with the condition of said counter, alternate electrical transmission path means connecting said first and second input terminals with said first output terminal, said alternate transmission path means comprising second gating means controlled from said third input terminal for controlling the passage of said positive and negative count pulses from said first and second input terminals to said first output terminal in accordance with the condition of said counter, and control means controlled from said third input terminal for actuating said switching means to selectively interconnect said first and second input terminals with said first and second output terminals in accordance with the condition of said counter.

12. Apparatus as described in claim 11 wherein said first gating means is arranged to be open to permit the passage of said count pulses for said second value of control signal and wherein said second gating means is arranged to be open to permit the passage of said count pulses for the first value of control signal.

13. Apparatus as described in claim 11 wherein said first gating means comprises first and second gating elements each of which comprises first and second inputs and an output, means connecting the first input of said first and second gating elements to said first and second input terminals, respectively, inverting means, means connecting said inverting means in series between said third input terminal and said second input of said first and second gating elements, and means connecting the outputs of said first and second gating elements to said switching means.

14. Apparatus as described in claim 13 wherein said second gating means comprises third and fourth gating elements each of which comprises first and second inputs and an output, means connecting the first and second inputs of said third gating element to said first and third input terminals, respectively, means connecting the first and second inputs of said fourth gating element to said second and third input terminals, respectively, and means connecting the outputs of said third and fourth gating elements to said first output terminal.

15. Apparatus as described in claim 14 wherein said control means comprises a flip-flop having first and second inputs connected to the outputs of said third and fourth gating elements, respectively, and output means coupled to said switching means for controlling same.

16. Apparatus for use with a bidirectional counter having a reference condition and positive and negative count conditions, said counter including input means for receiving positive and negative count pulses and output means for supplying a control signal having a first value corresponding to the reference condition of the counter and a second value corresponding to the positive and negative count conditions of the counter, said apparatus comprising first and second input terminals for receiving positive and negative count pulses, respectively, a third input terminal for connection to said counter output means for receiving said control signal, first and second output terminals for supplying positive and negative count pulses, respectively, to said counter input means, switching means serially connected between said first and second input and output terminals for selectively interconnecting said first and second input terminals with said first and second output terminals, and control means responsive to the control signal at said third input terminal for actuating said switching means in accordance therewith so as to interconnect said first and second input terminals with said first and second output terminals, respectively, in the positive condition of said counter and to interconnect said first and second input terminals with said second and first output terminals, respectively, in the negative condition of said counter.

References Cited by the Examiner

UNITED STATES PATENTS 2,889,534 6/1959 Lubkin ------------ 307—88.5

ARTHUR GAUSS, *Primary Examiner.*